(12) United States Patent
Hwangbo et al.

(10) Patent No.: US 12,135,872 B2
(45) Date of Patent: Nov. 5, 2024

(54) REMOTE CONTROL APPARATUS, METHOD, AND SYSTEM

(71) Applicant: LG ELECTRONICS INC., Seoul (KR)

(72) Inventors: Hanseok Hwangbo, Seoul (KR); Ohjae Kwon, Seoul (KR); Hyungjune Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/039,899

(22) PCT Filed: Dec. 1, 2020

(86) PCT No.: PCT/KR2020/017355
§ 371 (c)(1),
(2) Date: Jun. 1, 2023

(87) PCT Pub. No.: WO2022/118990
PCT Pub. Date: Jun. 9, 2022

(65) Prior Publication Data
US 2024/0004543 A1   Jan. 4, 2024

(51) Int. Cl.
*G06F 3/04886* (2022.01)
*G06F 3/041* (2006.01)
*G06F 3/04812* (2022.01)

(52) U.S. Cl.
CPC ...... *G06F 3/04886* (2013.01); *G06F 3/04812* (2013.01); *G06F 3/0414* (2013.01); *G06F 2203/04803* (2013.01)

(58) Field of Classification Search
CPC ............... G06F 3/0414; G06F 3/04812; G06F 3/04886; G06F 2203/04803
See application file for complete search history.

(56) References Cited

U.S. PATENT DOCUMENTS

| | | | |
|---|---|---|---|
| 2011/0304539 A1 | 12/2011 | Lee et al. | |
| 2020/0273323 A1 | 8/2020 | Kim et al. | |

FOREIGN PATENT DOCUMENTS

| | | |
|---|---|---|
| KR | 20040003092 | 1/2004 |
| KR | 20100067080 | 6/2010 |
| KR | 20110135707 | 12/2011 |
| KR | 20130115711 | 10/2013 |

OTHER PUBLICATIONS

Machine translation of KR 2004-0003092 (Year: 2023).*
Machine translation of KR 2010-0067080 (Year: 2023).*
Machine translation of KR 2013-0115711 (Year: 2023).*
PCT International Application No. PCT/KR2020/017355, International Search Report dated Aug. 17, 2021, 5 pages.

* cited by examiner

*Primary Examiner* — Michael Pervan
(74) *Attorney, Agent, or Firm* — LEE, HONG, DEGERMAN, KANG & WAIMEY

(57) ABSTRACT

A remote control apparatus according to an embodiment of the present invention comprises: a communication unit for communicating with a display apparatus; a display unit; and a control unit for outputting, via the display unit, a first group of keys corresponding to a remote control mode, and, in response to a keyboard mode activation signal received from a display apparatus, outputting a second group of keys corresponding to the keyboard mode.

18 Claims, 11 Drawing Sheets

REMOTE CONTROL APPARATUS, METHOD, AND SYSTEM

CROSS-REFERENCE TO RELATED APPLICATIONS

This application is the National Stage filing under 35 U.S.C. 371 of International Application No. PCT/KR2020/017355, filed on Dec. 1, 2020, the contents of which are all incorporated by reference herein in its entirety.

TECHNICAL FIELD

The present disclosure relates to a remote controller for providing a keyboard mode.

BACKGROUND ART

Remote controllers are used to remotely control electronic devices such as TVs, air conditioners, and optical disc players.

On the other hand, in a process of controlling an electronic device having a display or a display device using a remote controller, a signal with a specific frequency was simply transmitted to a device to be controlled according to input of a key button, and the device to be controlled performed a set operation in response to the key button.

In addition, as display devices such as TVs have advanced, it is possible for a user to directly control the cursor of the display device using a remote controller to execute a specific application provided in the display device, rather than simply outputting a screen on which data is received.

In addition, a specific application operation (for example, search, etc.) may be executed by outputting a keyboard on the display device and controlling the keyboard output on the display device using the remote controller.

On the other hand, this method has been increasing as a viewing environment has moved from normal TV viewing to web or Internet video content, but the remote controller is not equipped with a keyboard. Therefore, when searching for a search word in a search window through the display device or performing input using the keyboard for login, there was a problem in speed and efficiency in providing key input to the display device easily.

INVENTION

Technical Problem

An object of the present disclosure is to provide a remote controller equipped with a keyboard so that a keyboard key can be easily input to a display device.

An object of the present disclosure is to provide a remote controller having keyboard layouts of various languages by arranging keys of various languages in a remote controller equipped with a keyboard so as not to overlap each other.

Technical Solution

A remote controller for providing a remote control mode and a keyboard mode according to an embodiment of the present disclosure may comprise a communication unit configured to communicate with a display device, a display unit and a processor configured to output a first group of keys corresponding to the remote control mode through the display unit and to output a second group of keys corresponding to the keyboard mode in response to a keyboard mode activation signal received from the display device.

In addition, the processor of the remote controller of the present disclosure may deactivate the first group of keys and output the second group of keys in the keyboard mode, when the keyboard mode activation signal is received from the display device through the communication unit.

In addition, a case where the keyboard mode activation signal is received may comprise a case where character or number input to the display device is required.

In addition, the remote controller may further comprise a user input unit configured to receive user input, and the processor may deactivate the first group of keys and output the second group of keys in the keyboard mode, when a forced mode switching key is input through the user input unit.

In addition, the processor may deactivate the second group of keys and activate the first group of keys, when a keyboard use completion signal is received.

In addition, the remote controller further comprises a touch mode for controlling a cursor output on the display device, and the processor may switch the display unit to a touch pad capable of continuous touch input, when the touch mode is executed.

In addition, the first group of keys corresponding to the remote control mode may comprise keys in a first area for number input and keys in a second area for input of a specific operation.

In addition, the second group of keys corresponding to the keyboard mode may comprise a plurality of keys included in a keyboard layout and dividing lines dividing the plurality of keys.

In addition, the first group of keys may be disposed between the dividing lines.

In addition, arrangement directions of the first group of keys and the second group of keys may be orthogonal to each other.

In addition, the processor may output a third group of keys corresponding to the keyboard mode in response to the keyboard mode activation signal received from the display device, and the third group of keys may be disposed between a plurality of keys included in the second group of keys and the dividing lines.

In addition, the third group of keys may be a keyboard layout of a different language from the second group of keys.

In addition, a method of operating a remote controller for providing a remote control mode and a keyboard mode according to an embodiment of the present disclosure comprise outputting a first group of keys corresponding to the remote control mode, receiving a keyboard mode activation signal, and outputting a second group of keys corresponding to the keyboard mode in response to the keyboard mode activation signal.

In addition, the outputting the second group of keys corresponding to the keyboard mode in response to the keyboard mode activation signal may comprise deactivating the first group of keys and outputting the second group of keys in the keyboard mode.

In addition, the method may further comprise outputting a third group of keys corresponding to the keyboard mode in response to the keyboard mode activation signal received from the display device, and the third group of keys may be disposed between a plurality of keys included in the second group of keys and the dividing lines.

In addition, in a system comprising a display device and a remote controller configured to communicate with the display device and to provide a remote control mode and a keyboard mode, the display device may transmit a keyboard mode activation signal for character or number input to the remote controller, and the remote controller may output a first group of keys corresponding to the remote control mode through a display unit and output a second group of keys corresponding to the keyboard mode in response to a keyboard mode activation signal received from the display device.

Effect of the Invention

According to the present disclosure, by using a remote controller equipped with a keyboard, receiving a keyboard mode activation signal from a display device and outputting a second group of keys corresponding to the keyboard mode, characters or numbers can be easily input to the display device.

The present disclosure can effectively provide a keyboard corresponding to a language used by a user by providing a keyboard equipped with at least one or more languages.

BEST MODE

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

Figure 1:
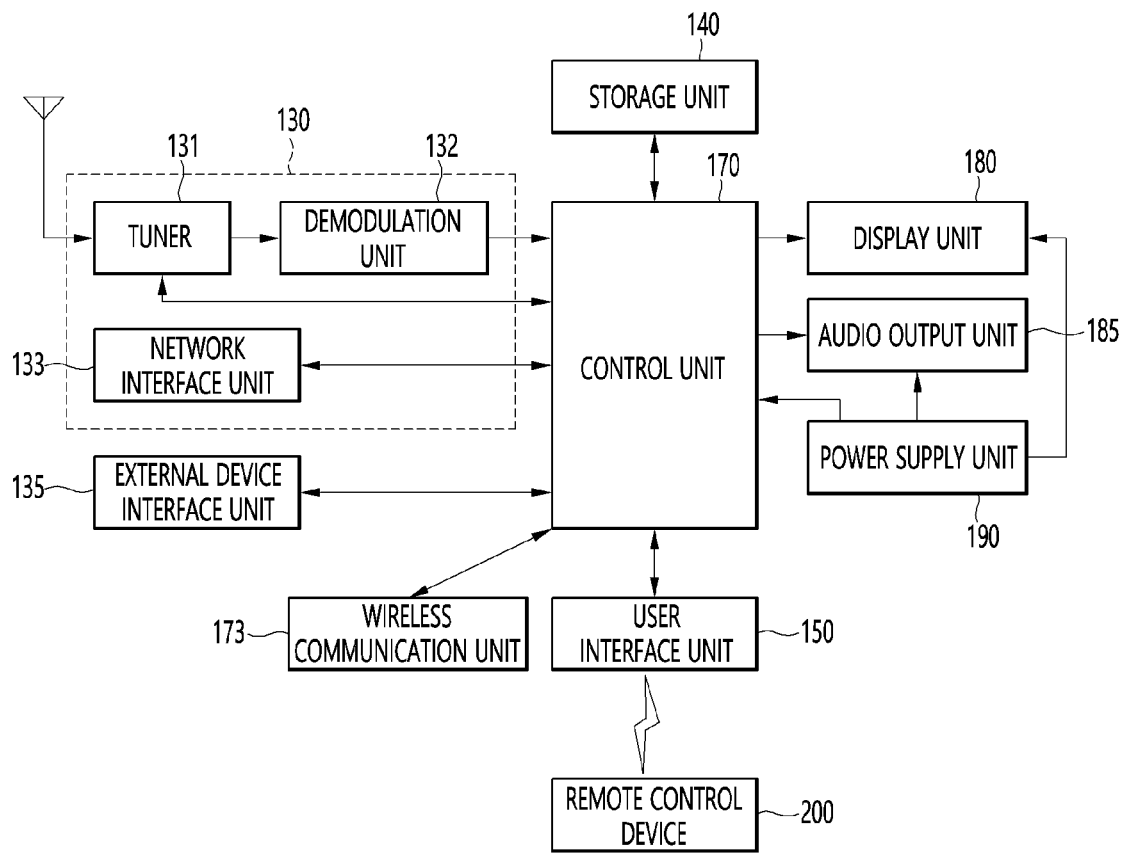
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast reception module 130, an external device interface unit 135, a storage unit 140, a user input unit 150, a control unit 170, a wireless communication interface unit 173, a display unit 180, an audio output unit 185, and a power supply unit 190.

The broadcast reception module 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program-related data signals, and may restore the divided video signals, audio signals, and data signals into an output available form.

The network interface 133 may provide an interface for connecting the display device 100 to a wired/wireless network comprising internet network. The network interface 133 may transmit or receive data to or from another user or another electronic device through an accessed network or another network linked to the accessed network.

The network interface unit 133 may access a predetermined webpage through an accessed network or another network linked to the accessed network. That is, the network interface unit 133 may transmit or receive data to or from a corresponding server by accessing a predetermined webpage through the network.

The network interface unit 133 may receive content or data provided from a content provider or a network operator. That is, the network interface unit 133 may receive content, such as movies, advertisements, games, VODs, and broadcast signals, which are provided from the content provider or the network operator, and information relating thereto through the network.

In addition, the network interface unit 133 may receive firmware update information and update files provided from the network operator, and may transmit data to the Internet or content provider or the network operator.

The network interface 133 may select and receive a desired application among applications open to the air, through network.

The external device interface unit 135 may receive an application or an application list in an adjacent external device and deliver the application or the application list to the control unit 170 or the storage unit 140.

The external device interface unit 135 may provide a connection path between the display device 100 and an external device. The external device interface unit 135 may receive at least one of an image or audio outputted from an external device that is wirelessly or wiredly connected to the display device 100 and deliver the received image or the audio to the controller. The external device interface unit 135 may include a plurality of external input terminals. The plurality of external input terminals may include an RGB terminal, at least one High Definition Multimedia Interface (HDMI) terminal, and a component terminal.

An image signal of an external device inputted through the external device interface unit 135 may be outputted through the display unit 180. A sound signal of an external device inputted through the external device interface unit 135 may be outputted through the audio output unit 185.

An external device connectable to the external device interface unit 135 may be one of a set-top box, a Blu-ray player, a DVD player, a game console, a sound bar, a smartphone, a PC, a USB Memory, and a home theater system but this is just exemplary.

Additionally, some content data stored in the display device 100 may be transmitted to a user or an electronic device, which is selected from other users or other electronic devices pre-registered in the display device 100.

The storage unit 140 may store signal-processed image, voice, or data signals stored by a program in order for each signal processing and control in the control unit 170.

In addition, the storage unit 140 may perform a function for temporarily storing image, voice, or data signals output from the external device interface unit 135 or the network interface unit 133, and may store information on a predetermined image through a channel memory function.

The storage unit 140 may store an application or an application list input from the external device interface unit 135 or the network interface unit 133.

The display device 100 may play content files (e.g., video files, still image files, music files, document files, application files, etc.) stored in the storage unit 140, and may provide the content files to a user.

The user input unit 150 may transmit signals input by a user to the control unit 170, or may transmit signals from the control unit 170 to a user. For example, the user input unit 150 may receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR communication methods.

In addition, the user input unit 150 may transmit, to the control unit 170, control signals input from local keys (not shown) such as a power key, a channel key, a volume key, and a setting key.

Image signals that are image-processed by the control unit 170 may be input to the display unit 180 and displayed as images corresponding to the image signals. In addition, image signals that are image-processed by the control unit 170 may be input to an external output device through the external device interface unit 135.

Voice signals processed by the control unit 170 may be output to the audio output unit 185. In addition, voice signals processed by the control unit 170 may be input to the external output device through the external device interface unit 135.

Additionally, the control unit 170 may control overall operations of the display device 100.

In addition, the control unit 170 may control the display device 100 by a user command or an internal program input through the user input unit 150, and may access the network to download a desired application or application list into the display device 100.

The control unit 170 may output channel information selected by a user together with the processed image or voice signals through the display unit 180 or the audio output unit 185.

In addition, the control unit 170 may output image signals or voice signals of an external device such as a camera or a camcorder, which are input through the external device interface unit 135, through the display unit 180 or the audio output unit 185, according to an external device image playback command received through the user input unit 150.

Moreover, the control unit 170 may control the display unit 180 to display images, and may control the display unit 180 to display broadcast images input through the tuner 131, external input images input through the external device interface unit 135, images input through the network interface unit, or images stored in the storage unit 140. In this case, an image displayed on the display unit 180 may be a still image or video and also may be a 2D image or a 3D image.

Additionally, the control unit 170 may play content stored in the display device 100, received broadcast content, and external input content input from the outside, and the content may be in various formats such as broadcast images, external input images, audio files, still images, accessed web screens, and document files.

Moreover, the wireless communication unit 173 may perform wired or wireless communication with an external device. The wireless communication unit 173 may perform short-range communication with an external device. For this, the wireless communication unit 173 may support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication unit 173 may detect (or recognize) a wearable device capable of communication around the display device 100. Furthermore, if the detected wearable device is a device authenticated to communicate with the display device 100, the control unit 170 may transmit at least part of data processed in the display device 100 to the wearable device through the wireless communication unit 173. Therefore, a user of the wearable device may use the data processed by the display device 100 through the wearable device.

The voice acquisition unit 175 may acquire audio. The voice acquisition unit 175 may include at least one microphone (not shown) and may acquire audio around the display device 100 through the microphone (not shown).

The display unit 180 may convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface unit 133 or the external device interface unit 135 and play them without including the tuner 131 and the demodulation unit 132.

For example, the display device 100 may be divided into an image processing device such as a set-top box for receiving broadcast signals or contents according to various network services and a content playback device for playing content input from the image processing device.

In this case, an operating method of a display device according to an embodiment of the present disclosure described below may be performed by one of the display device described with reference to FIG. 1, an image processing device such as the separated set-top box, and a content playback device including the display unit 180 and the audio output unit 185.

The audio output unit 185 receives the audio-processed signal from the control unit 170 to output an audio signal.

The power supply unit 190 supplies the corresponding power to the entire display device 100. Particularly, power may be supplied to the control unit 170 that is capable of being implemented in the form of a system on chip (SOC), the display unit 180 for displaying an image, the audio output unit 185 for outputting audio, and the like.

Specifically, the power supply unit 190 may include a converter that converts AC power to DC power and a DC/DC converter that converts a level of the DC power.

A remote control device according to an embodiment of the present disclosure will be described with reference to FIGS. 2 and 3.

Figure 2:
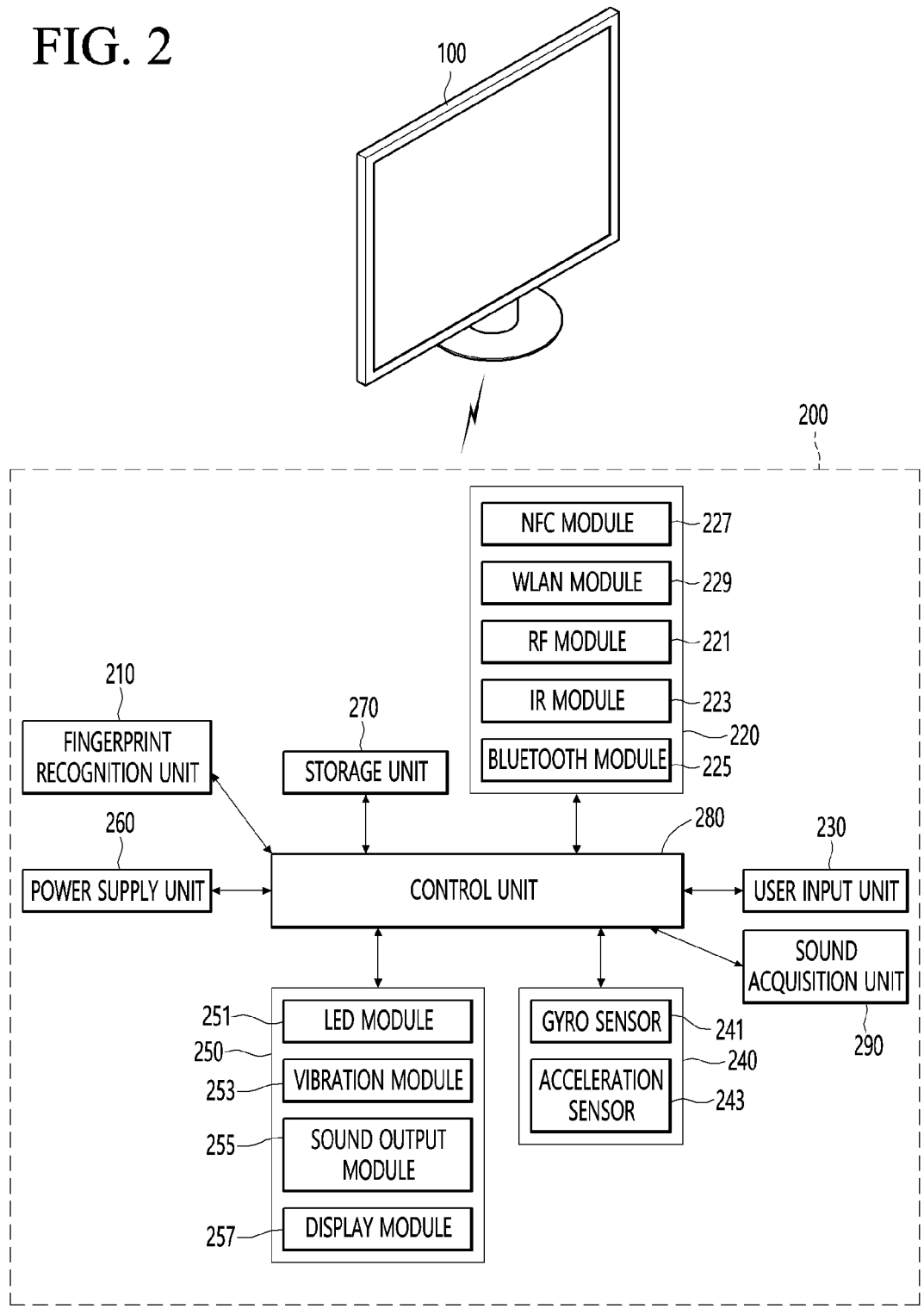
FIG. 2 is a block diagram illustrating a remote control device according to an embodiment of the present disclosure.
Figure 3:
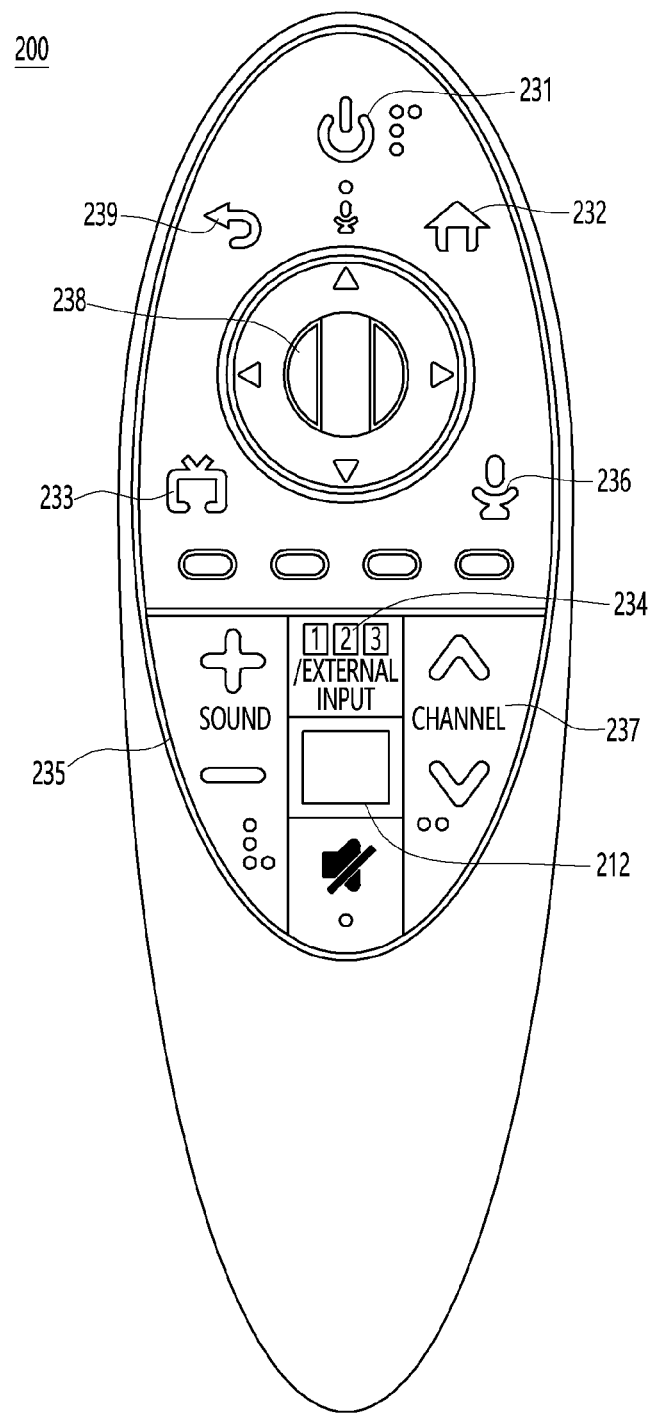
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present disclosure.

The remote control device 200 may include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 may include a Bluetooth module 225 capable of transmitting or receiving signals to or from the display device 100 according to a Bluetooth communication standard. In addition, the remote control device 200 may include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 may transmit signals containing information on the movement of the remote control device 200 to the display device 100 through the wireless communication unit 220.

Moreover, the remote control device 200 may receive signals transmitted from the display device 100 through the RF module 221 and if necessary, may transmit a command for power on/off, channel change, and volume change to the display device 100 through the IR module 223.

The user input unit 230 may be configured with a keypad, a button, a touch pad, or a touch screen. A user may operate the user input unit 230 to input a command relating to the display device 100 to the remote control device 200. If the user input unit 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be a button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The volume control button 235 may be a button for controlling a volume output from the display device 100. The voice recognition button 236 may be a button for receiving user's voice and recognizing the received voice. The channel change button 237 may be a button for receiving broadcast signals of a specific broadcast channel. The OK button 238 may be a button for selecting a specific function, and the back button 239 may be a button for returning to a previous screen.

FIG. 2 is described again.

If the user input unit 230 includes a touch screen, a user may touch a soft key of the touch screen to input a command relating to the display device 100 to the remote control device 200. In addition, the user input unit 230 may include various kinds of input interfaces operable by a user, for example, a scroll key and a jog key, and this embodiment does not limit the scope of the present disclosure.

The sensor unit 240 may include a gyro sensor 241 or an acceleration sensor 243. The gyro sensor 241 may sense information on the movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor that senses a distance with respect to the display unit 180 of the display device 100.

The output unit 250 may output image or voice signals in response to the operation of the user input unit 230, or may output image or voice signals corresponding to signals transmitted from the display device 100. A user may recognize whether the user input unit 230 is operated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste may be reduced. The power supply unit 260 may resume the supply of power if a predetermined key provided at the remote control device 200 is operated.

The storage unit 270 may store various kinds of programs and application data required to control or operate the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 may store, in the storage unit 270, information on a frequency band for transmitting/receiving signals to/from the display device 100 paired with the remote control device 200 and refer to it.

The control unit 280 controls general matters relating to the control of the remote control device 200. The control unit 280 may transmit a signal corresponding to a predetermined key operation of the user input unit 230 or a signal corresponding to the movement of the remote control device 200 sensed by the sensor unit 240 to the display device 100 through the wireless communication unit 220.

In addition, the sound acquisition unit 290 of the remote control device 200 may acquire voice.

The sound acquisition unit 290 may include at least one microphone and acquire voice through the microphone.

Figure 4:
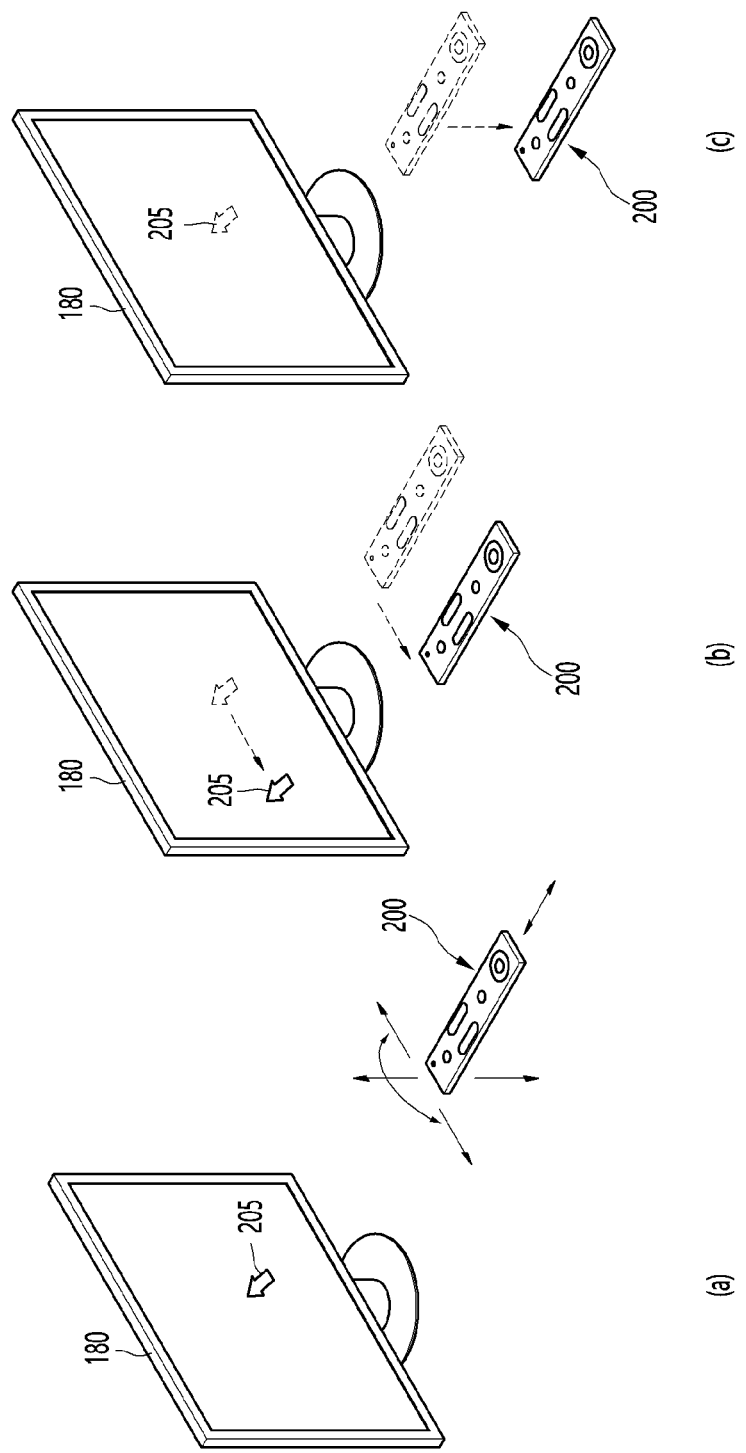
FIG. 4 is a view illustrating an example of utilizing a remote control device according to an embodiment of the present disclosure.

Next, FIG. 4 is described.

FIG. 4 is a view illustrating an example of utilizing a remote control device according to an embodiment of the present disclosure.

FIG. 4(a) illustrates that a pointer 205 corresponding to the remote control device 200 is displayed on the display unit 180.

A user may move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(b) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(c) illustrates that while a specific button in the remote control device 200 is pressed, a user moves the remote control device 200 away from the display unit 180. Thus, a selected region in the display unit 180 corresponding to the pointer 205 may be zoomed in and displayed in an enlarged size.

On the other hand, if a user moves the remote control device 200 close to the display unit 180, a selection area in the display unit 180 corresponding to the pointer 205 may be zoomed out and displayed in a reduced size.

On the other hand, if the remote control device 200 is moved away from the display unit 180, a selection area may be zoomed out and if the remote control device 200 is moved closer to the display unit 180, a selection area may be zoomed in.

Additionally, if a specific button in the remote control device 200 is pressed, recognition of a vertical or horizontal movement may be excluded. That is, if the remote control device 200 is moved away from or closer to the display unit 180, the up, down, left, or right movement cannot be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display unit 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display unit 180 and also may be displayed in correspondence to a plurality of points such as a line and a surface.

Hereinafter, an operation of the remote controller 200 according to an embodiment of the present disclosure will be described. First, the output unit 250 of the remote controller 200 according to the embodiment of the present disclosure may be used interchangeably with the display unit 250.

In addition, when the user input unit 230 has a touch-screen, the display unit 250 of the remote controller 200 shall be understood to include the role configuration of the user input unit 230.

Figure 5:
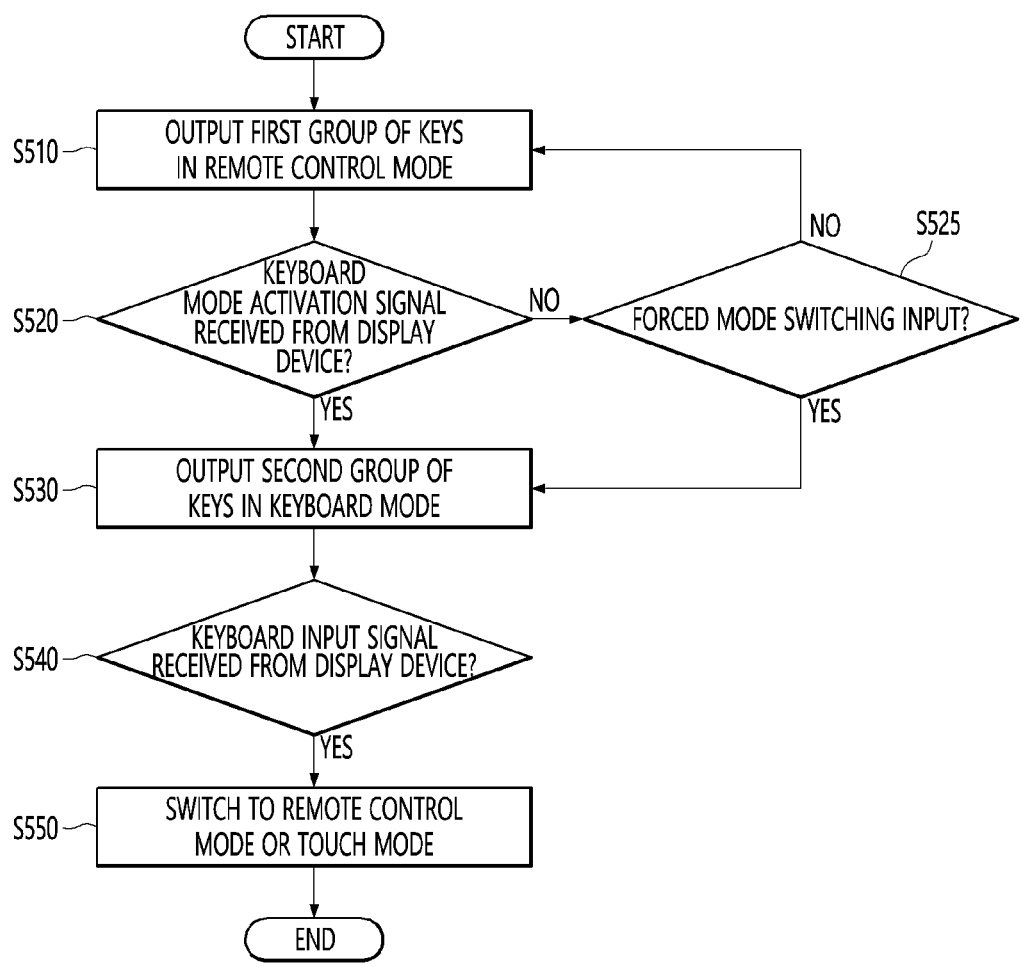
FIG. 5 is a flowchart according to an embodiment of the present disclosure.

FIG. 5 is a flowchart according to an embodiment of the present disclosure.

First, the remote controller 200 according to an embodiment of the present disclosure may include a remote control mode for controlling a first group of keys capable of controlling the normal operation of the display device 100, such as change and control of channels, volumes, settings of connected devices, and a keyboard mode for outputting a second group of keys included in a keyboard layout capable of inputting characters, numbers, and special characters, such as a keyboard.

At this time, the keyboard layout may include various keyboard layouts disclosed in the prior art, such as a Korean keyboard, a QWERTY keyboard, a Dvorak keyboard, a Colemak keyboard, a QWERTZ keyboard, and an AZERTY keyboard.

In addition, the display unit 250 of the remote controller 200 serves as a touch pad and may include a touch mode for controlling the cursor of the connected display device 100.

Hereinafter, mutual switching between the remote control mode, the keyboard mode, and the touch mode will be described.

Referring to FIG. 5, the control unit 280 of the remote controller 200 may output the first group of keys through the display unit 250 in remote control mode (S510).

In general, the control unit 280 of the remote controller 200 may output the first group of keys corresponding to the remote control mode through the display unit 250.

As described above, the remote control mode may be a mode for providing channel, volume control and other setting operation of the display device 100 or the other device controlled through the remote controller 200.

At this time, the display unit 250 of the remote controller 200 may simultaneously serve as a touch sensor as a user input unit, and a user may transmit, to the remote controller 200, a command signal corresponding to a key by touching the key output to the display unit 250.

In addition, a form such as a hard key provided on the display unit 250 to perform key input by physical pressure may also be possible.

According to the embodiment of the present disclosure, the control unit 280 of the remote controller 200 may receive a keyboard mode activation signal from the display device 100 (S520-YES).

Specifically, the control unit 280 of the remote controller 200 may receive the keyboard mode activation signal through the communication unit communicating with the display device 100.

At this time, the keyboard mode activation signal may be transmitted from the display device 100 to the remote controller 200, when character or number input to the display device 100 connected to the remote controller 200 is required.

For example, when the display device 100 outputs content such as movies, advertisements, games, VOD and broadcast signal provided from content providers or network providers and information related thereto, the user may want to input a specific search word or search for specific content to or on the display device 100.

The user may input a specific button for outputting the search window using the display device 100 or the remote controller 200.

The display device 100 may output the search window for searching for the specific search word or the specific content in response to the input of the specific button.

When the search window is output, the display device 100 may transmit the keyboard mode activation signal to the remote controller 200.

The control unit 280 of the remote controller 200 may output a second group of keys corresponding to the keyboard mode, in response to the keyboard mode activation signal received from the display device 100 (S530).

At this time, the control unit 280 of the remote controller 200 may deactivate the first group of keys corresponding to the remote control mode and output the second group of keys corresponding to the keyboard mode.

Meanwhile, according to the embodiment of the present disclosure, the user may want to change the remote controller 200 to the keyboard mode, even when the keyboard mode activation signal is not received from the display device 100.

For example, the display device 100 connected to the remote controller 200 may not include a function for the keyboard mode or may not transmit the keyboard mode activation signal due to malfunction.

At this time, the user may switch the remote controller 200 from the remote control mode to the keyboard mode using a forced mode switching key provided in the remote controller 200.

When the forced mode switching key is input through the user input unit, the remote controller 200 may deactivate the first group of keys of the remote control mode and output the second group of keys corresponding to the keyboard mode (S525).

Specifically, the forced mode switching key may be composed of an operation of pressing a hard key or a soft key such as a channel or volume up key provided in the remote controller 200.

According to the embodiment of the present disclosure, the remote controller 200 may output the second group of keys corresponding to the keyboard mode, and the user may perform an operation for selecting at least one of a plurality of keys included in the second group of keys.

The control unit 280 of the remote controller 200 may transmit information on at least one key selected by the user to the display device 100.

The display device 100 may receive information on at least one key from the remote controller 200 and output it in the search window of the display device 100.

When user input is completed, the display device 100 may transmit a keyboard input completion signal to the remote controller 200. The remote controller 200 may finish the keyboard mode in response to the keyboard input completion signal received from the display device 100.

Specifically, when a keyboard use completion signal is received, the control unit 280 of the remote controller 200 may deactivate the second group of keys through the display unit 250 and activate the first group of keys to output the remote control mode (S550).

Meanwhile, according to the embodiment of the present disclosure, when the keyboard use completion signal is received, the remote controller 200 may activate a touch mode for controlling a cursor output on the display device 100.

At this time, when the touch mode is executed, the control unit 280 of the remote controller 200 may switch the display unit 250 to a touch pad capable of continuous touch input (S550).

Meanwhile, according to the embodiment of the present disclosure, the remote control mode, touch mode and keyboard mode provided by the remote controller may be mutually switched through the user input unit regardless of the order of mutual modes and the order is not limited thereto.

Hereinafter, the remote control mode, keyboard mode and touch mode of the remote controller 200 will be described with reference to FIGS. 6 to 8.

Figure 6:
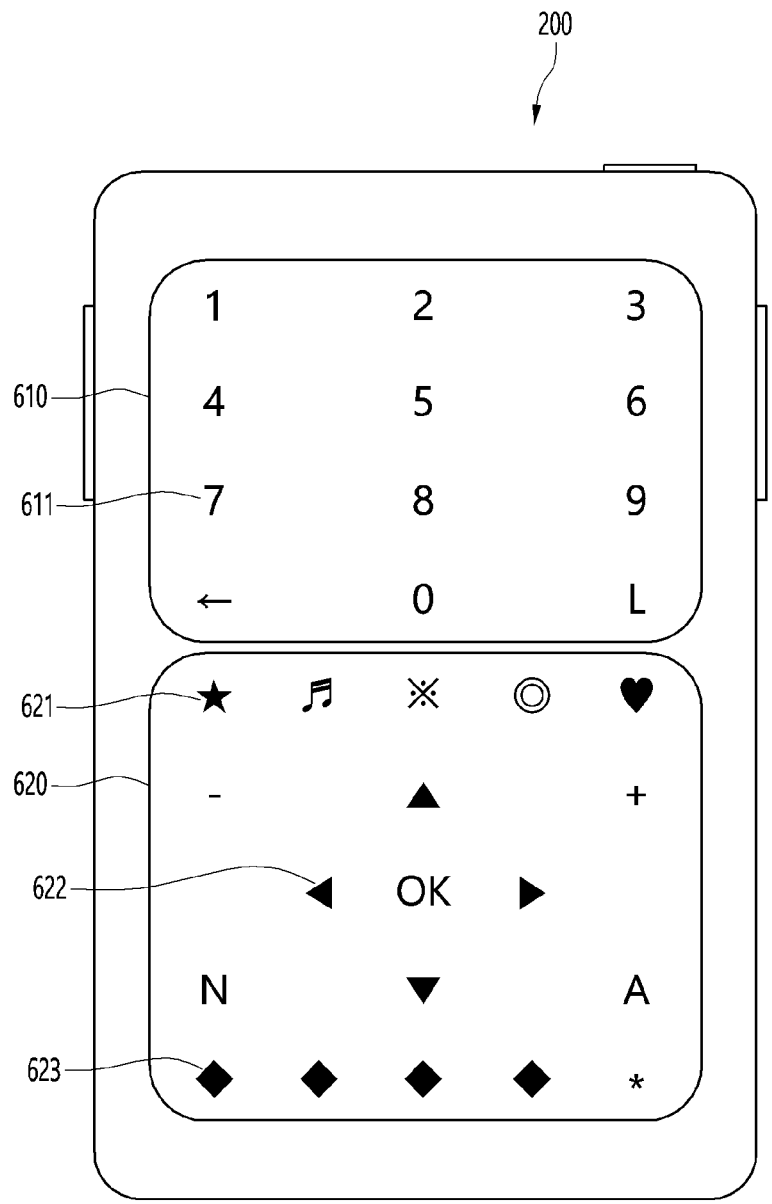
FIG. 6 is a view illustrating a remote control mode according to an embodiment of the present disclosure.

FIG. 6 is a view illustrating a remote control mode according to an embodiment of the present disclosure.

Referring to FIG. 6, when the remote control mode is activated, the display unit 250 of the remote controller 200 may output the first group of keys corresponding to the remote control mode.

Specifically, the first group of keys corresponding to the remote control mode may include keys in a first area 610 for number input and keys in a second area 620 for input of a specific operation.

More specifically, in the first area 610, the first group of keys may include a plurality of number input keys 611 for number input. The plurality of number input keys 611 may be arranged so that numbers '0' to '9' are spaced apart from each other by a predetermined gap in the first area 611.

When user input (e.g., touch input or physical pressure detection) is detected through the plurality of number input keys 611, the control unit 280 of the remote controller 200 may transmit a number corresponding to the number input key 611 to the display device 100.

The display device 100 may change the channel according to the number corresponding to the number input key 611.

According to the embodiment of the present disclosure, in the second area 620, the first group of keys may include a special character key 621 for specific operation input, a channel/volume change key 622 and a specific function key 623.

For example, the specific character key 621 may be a key for transmitting a command for executing a specific application for each key.

The channel/volume change key 622 may be a key for changing a channel output by the display device 100 or control the sound volume of the display device 100.

In addition, the specific function key 623 may be a key for performing other operation assigned to the key.

The special character key 621, channel/volume change key 622 and specific function key 623 in the second area 620 may be arranged to be spaced apart from each other.

When user input (e.g., touch input or physical pressure detection) is detected in the second area 620, the control unit 280 of the remote controller 200 may transmit a function execution command corresponding to the key to the display device 100.

The display device 100, which has received the transmitted command, may perform a function corresponding to the function of the input key.

Meanwhile, the first area 610 and the second area 620 are used to describe the display unit 250, are not limited to the specific area of the display unit 250 as shown in the drawing, and may be changed according to various embodiments of the remote controller 200.

Figure 7:
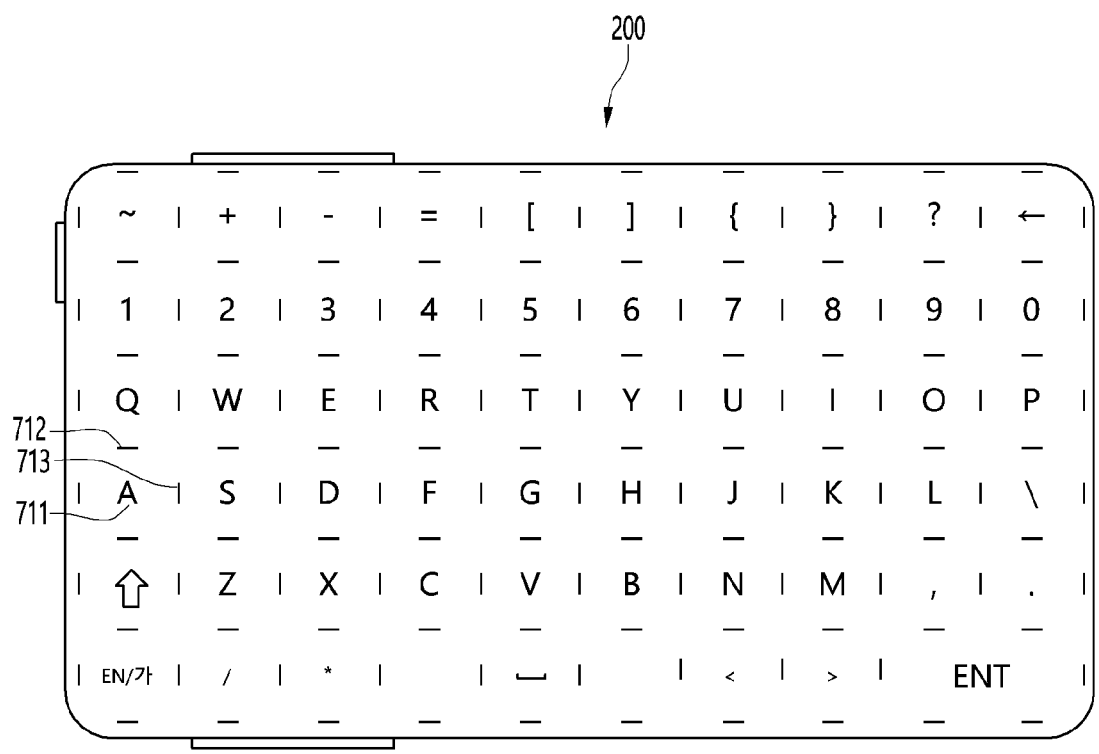
FIG. 7 is a view illustrating a keyboard mode according to an embodiment of the present disclosure.

FIG. 7 is a view illustrating a keyboard mode according to an embodiment of the present disclosure.

Referring to FIG. 7, the display unit 250 of the remote controller 200 may output the second group of keys corresponding to the keyboard mode.

At this time, the second group of keys corresponding to the keyboard mode may include a plurality of keys 711 included in a key layout and dividing lines 712 and 713 dividing the plurality of keys 711.

The plurality of keys 711 included in the keyboard layout may include characters, numbers, special characters or function keys (e.g., a space bar, an enter key, an arrow Korean-English conversion key).

At this time, the plurality of keys 711 included in the keyboard layout may be arranged to be spaced apart from each other.

When user input (e.g., touch input or physical pressure detection) is detected in any one of the plurality of keys 711 included in the keyboard layout, the control unit 280 of the remote controller 200 may input a character or number corresponding to the key in the search window displayed on the display device 100.

The display device 100 may output the character or number corresponding to the input key to the search window.

In addition, a function corresponding to a function key among the plurality of keys 711 included in the keyboard layout from the remote controller 200 may be performed in the search window of the display device 100.

In addition, the control unit 280 of the remote controller 200 according to the embodiment of the present disclosure may output the dividing lines 712 and 713 dividing the plurality of keys 711 included in the keyboard layout through the display unit 250.

At this time, the dividing lines 712 and 713 may refer to lines indicating recognition areas of the plurality of keys 711 included in the keyboard layout. For example, the dividing lines 712 and 713 may be arranged on the top, bottom, left and right sides of the plurality of keys 711 included in the keyboard layout, and may be arranged so that a direction orthogonal to directions in which the dividing lines 712 and 713 are directed are directed toward the plurality of keys.

Meanwhile, when user input is received in the dividing line of the remote controller 200, in order to prevent the plurality of keys 711 around the dividing line from being recognized, the control unit 280 of the remote controller 200 may determine an input error when user input is detected in the dividing lines 712 and 713.

Accordingly, no input will be input to the search window of the display device 100.

Meanwhile, the second group of keys shown in FIG. 7 only corresponds to an embodiment of the layout of the keyboard mode and the embodiment of the present disclosure shall not be construed as being limited to the examples shown in the drawings.

Figure 8:
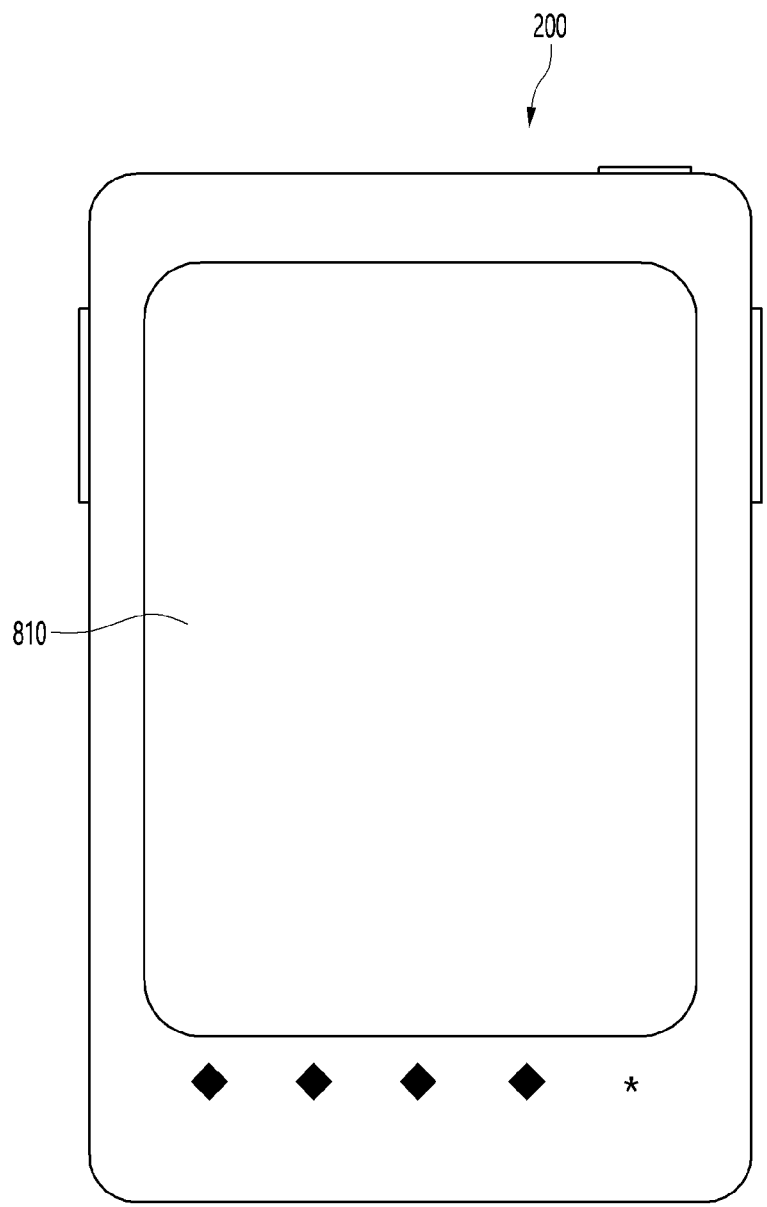
FIG. 8 is a view illustrating a touch mode according to an embodiment of the present disclosure.

FIG. 8 is a view illustrating a touch mode according to an embodiment of the present disclosure.

Referring to FIG. 8, the remote controller 200 may further include a touch mode for controlling a cursor output on the display device 100. The control unit 280 of the remote controller 200 may output a touch input window 810 when the touch mode is executed.

At this time, the control unit 280 of the remote controller 200 may switch an area corresponding to the touch input window 810 of the display unit 250 to a touch pad capable of continuous touch input.

Specifically, when the touch mode is activated, the control unit 280 of the remote controller 200 may deactivate a key activated in the remote control mode and the keyboard mode.

That is, the entire touch input window 810 of the screen of the display unit 250 may be regarded as a touch pad capable of controlling the cursor of the display device 100.

Figure 9:
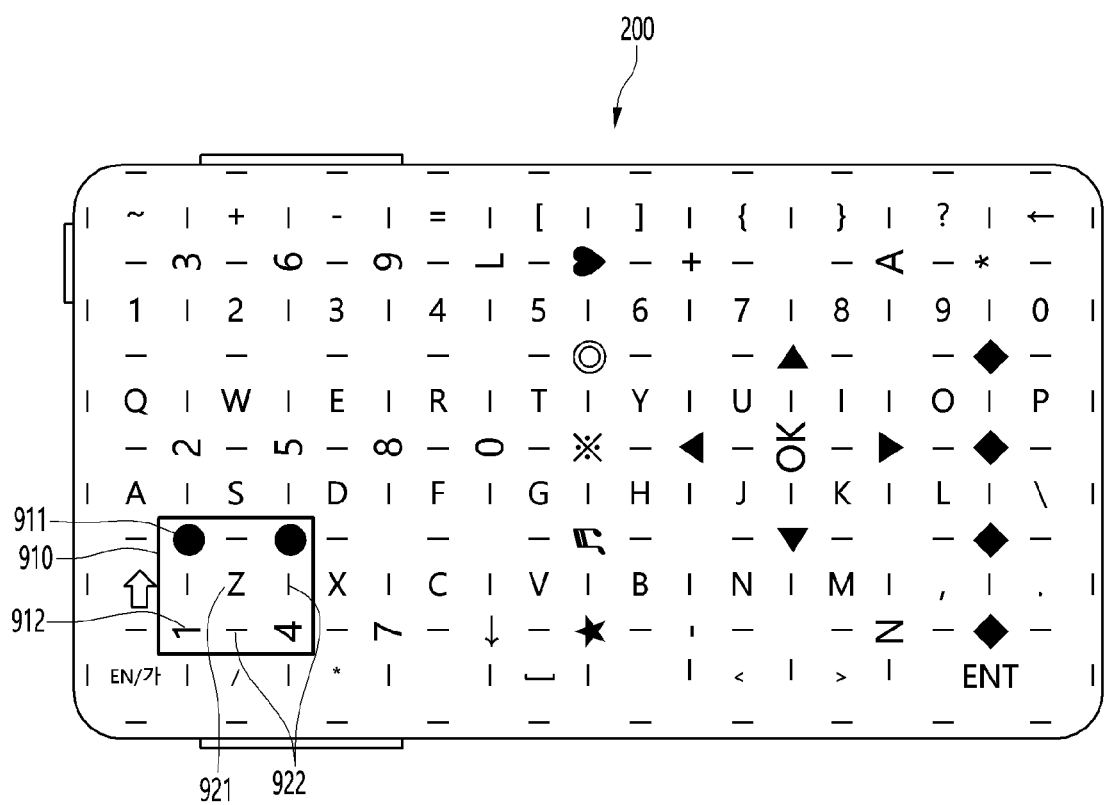
FIG. 9 is a view illustrating a key layout of a display unit according to an embodiment of the present disclosure.

FIG. 9 is a view illustrating a key layout of the display unit 250 according to the embodiment of the present disclosure.

Referring to FIG. 9, a first group of keys 911 and 912 corresponding to the remote control mode and a second group of keys 921 and 922 corresponding to the keyboard mode are all shown.

However, this is for explaining arrangement of the first group of keys and the second groups of keys in the display unit 250, and it should be understood that the remote controller 200 activates the first group of keys 911 and 912 in the remote control mode and activates the second group of keys 921 and 922 in the keyboard mode.

According to the embodiment of the present disclosure, in the display unit 250 of the remote controller 200, the keys included in the first group of keys and the keys included in the second group of keys may be arranged to be spaced apart from each other.

Specifically, the first groups of keys of the remote control mode and the second groups of keys of the keyboard mode may be disposed not to overlap each other. More specifically, each of the first group of keys 911 and 912 may be disposed between the dividing lines 912 dividing the plurality of keys 921 included in the keyboard layout of the second group of keys 921 and 922. In addition, the arrangement directions of the first groups of keys and the second groups of keys may be orthogonal to each other.

For example, in a partial area 910 of the display unit 250 of the remote controller 200, 'Z' which is a character key 921 of the second group of keys 921 and 922 may be disposed to be orthogonal to the numeric key 912 of the first group of keys 911 and 912.

In addition, the dividing lines 922 may be disposed on the top, bottom, left and right sides of each of the plurality of keys 921 included in the second group of keys. In addition, the plurality of keys 912 (e.g., '1' and '4') included in the first group of keys may be disposed between the dividing lines 922 of the second group of keys.

Meanwhile, although '1' and '4' which are some of the plurality of keys included in the first group of keys included in the partial area 910 are described in FIG. 9, the plurality of keys included in the first group of keys may be additionally disposed in the remaining area 911.

Hereinafter, the remote controller 200 for providing various languages at once according to the embodiment of the present disclosure will be described with reference to FIG. 10.

Figure 10:
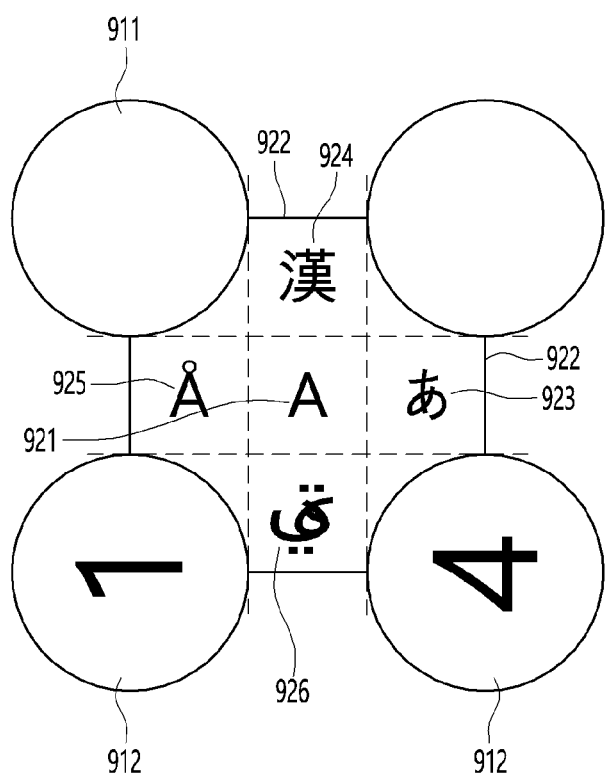
FIG. 10 is a view illustrating a key layout of a display unit according to an embodiment of the present disclosure.

FIG. 10 is a view illustrating a key layout of the display unit 250 according to an embodiment of the present disclosure.

FIG. 10 is a view specifically illustrating the partial area 910 of FIG. 9 in order to describe the remote controller 200 capable of providing various languages.

According to the embodiment of the present disclosure, at least one of 912 of a number input key, special character key, channel volume change key or specific function key of the first group of keys may be disposed between the dividing lines 922 of the second group of keys.

The dividing lines 922 may be disposed on the top, bottom, left, and right sides of at least one 912 of the numeric keys, character keys, and function keys of the second group of keys.

Specifically, when the dividing line 922 extends in the longitudinal direction, the first group of keys may be disposed at imaginary contact points of the dividing lines 922 orthogonal to each other.

In addition, when the plurality of keys 921 (including, for example, character keys, numeric keys, and function keys) of the second group of keys may be disposed on an imaginary plane where the dividing lines 922 orthogonal to each other overlap, when the dividing lines 922 extend in a plane direction.

Therefore, as shown in FIG. 9, the plurality of keys 921 of the second group of keys may be located in a diagonal direction with at least one 912 of the first group of keys, and the key arrangement direction of the first group may be orthogonal to the key arrangement direction of the second group.

Hereinafter, a method of activating a third group according to an embodiment of the present disclosure will be described.

According to the embodiment of the present disclosure, the remote controller 200 may output the second group of keys in response to a keyboard mode activation signal received from the connected display device 100.

In addition, in response to the keyboard mode activation signal received from the connected display device 100, the third group of keys corresponding to the keyboard mode may be output.

In this case, the third group of keys may have a keyboard layout of a language different from that of the second group of keys. That is, the second group of keys may be composed of a second language and the third group of keys may be composed of a third language.

Specifically, the plurality of keys 923 to 926 included in the third group of keys may be keys obtained by translating any one of the plurality of keys 921 included in the second group of keys into the third language. For example, when a key included in the second group of keys is 'Q', any one of the plurality of keys 923 to 926 included in the third group of keys may be a key obtained by translating 'Q' into a language other than English. As a more specific example, when the third language is Korean, it may be ''ㅂ''.

The third group of keys may be disposed between the plurality of keys 921 included in the second group of keys and the dividing line 922. A specific example related thereto will be described with reference to FIG. 11.

Figure 11:
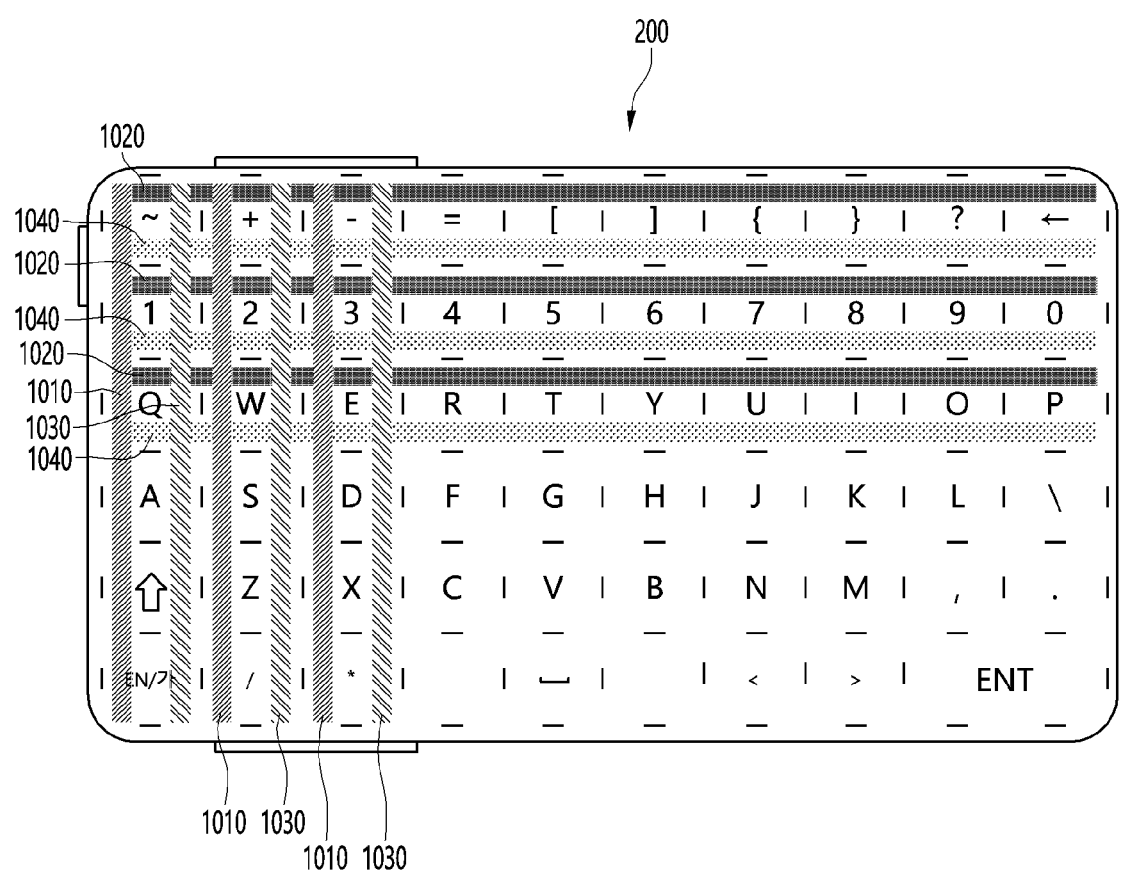
FIG. 11 is a view illustrating a key layout of a display unit according to an embodiment of the present disclosure.

FIG. 11 is a view illustrating a key layout of the display unit 250 according to an embodiment of the present disclosure.

Referring to FIG. 11, the control unit 280 of the remote controller 200 may output the second group of keys through the display unit 250 when the keyboard mode activation signal is received.

In this case, the second group of keys may include a plurality of keys (e.g., 921) including character keys, numeric keys and function keys and dividing lines dividing the plurality of keys 921.

Meanwhile, the user may be familiar with a language other than the language of the second group of keys provided by the remote controller 200 or may want to receive a keyboard layout in a different language.

According to an embodiment of the present disclosure, the control unit 280 of the remote controller 200 may output the third group of keys having a keyboard layout of a language different from the language used in the second group of keys through the display unit 250.

In this case, a second keyboard mode activation signal may be the same as the above-described keyboard mode activation signal.

Alternatively, it is a signal different from the keyboard mode activation signal and may be received by the remote controller 200 when the user inputs a specific key or activation of the third group of keys is required from the display device 100.

According to the embodiment of the present disclosure, the third group of keys may be disposed in parallel with the plurality of keys 921 included in the second group of keys.

For example, each key included in the third group of keys may be disposed in a space between any one of the plurality of keys 921 included in the second group of keys and the dividing line.

Specifically, referring to FIG. 11, the third group of keys may be disposed in a plurality of columns 1010 and 1030 or a plurality of rows 1020 and 1040 present between the key 921 included in the second group of keys and the dividing line.

In this case, the third group of keys may be disposed only in any one of the plurality of columns 1010 and 1030 or the plurality of rows 1020 and 1040.

Meanwhile, although some of the plurality of columns 1010 and 1030 or the plurality of rows 1020 and 1040 are shown, the plurality of columns 1010 and 1030 or the plurality of rows 1020 and 1040 may be disposed throughout the display unit 250.

For example, the third group of keys may be disposed in a first column group 1010 of the plurality of columns present between the left side of the plurality of keys 921 included in the second group of keys and the dividing line.

That is, as shown in FIG. 11, the third group of keys is a keyboard layout having a different language from the second group of keys and four different languages may be disposed in the plurality of columns 1010 and 1030 or the plurality of rows 1020 and 1040.

In other words, keyboard layouts of different languages may be disposed in the first column group 1010, the second column group 1030, the first row group 1020 and the second row group 1040.

Meanwhile, the above description is only an example and is not limited to the above example.

According to the embodiment of the present disclosure, the control unit 280 of the remote controller 200 may output the third group of keys having a keyboard layout of a different language from the second group of keys in the plurality of columns 1010 and 1030 or the plurality of rows 1020 and 1040 between the plurality of keys 921 included in the second group of keys and the dividing line while maintaining activation of the second group of keys, when the activation signal of the third group of keys is received.

In this case, the plurality of columns 1010 and 1030 or the plurality of rows 1020 and 1040 may be present between a specific direction of the plurality of keys 921 included in the second group of keys and a dividing line in a specific direction.

For example, the control unit 280 of the remote controller 200 may select any one of the plurality of columns 1010 and 1030 or the plurality of rows 1020 and 1040, and output the third group of keys in the selected row group or column group.

The display unit 250 of the remote controller 200 according to the embodiment of the present disclosure may include a plurality of diffusion plates. In this case, the plurality of diffusion plates may be disposed between a specific direction of the plurality of keys included in the second group of keys and the dividing line in the specific direction, thereby forming one group.

For example, the plurality of diffusion plates may be composed of the first group 1010, the second group 1020, the third group 1030 and the fourth group 1040, and keys of different languages may be disposed on the display unit 250 corresponding to each group.

For example, when a signal for activating a key corresponding to a specific language of the third group of keys is received, the remote controller 200 may control the display unit 250 so that the diffusion plate of the first group 1010 corresponding to the specific language is activated.

According to the embodiment of the present disclosure, the display unit 250 may be formed by attaching a plurality of films, the keyboard layout included in the third group of keys is engraved on each of the plurality of films, and activation of the third group of keys may be output as a light source provided in the display unit 250 emits light.

For example, the user may select a film on which a keyboard layout of a desired language from among the films capable of being attached to the display unit 250 and receive the language keyboard by attaching the film to the display unit 250.

Meanwhile, in the method of operating the remote controller 200 providing the remote control mode and the keyboard mode according to the embodiment of the present disclosure, the method of operating the remote controller 200 may include outputting a first group of keys corresponding to the remote control mode, receiving a keyboard mode activation signal and outputting a second group of keys corresponding to the keyboard mode in response to the keyboard mode activation signal.

In addition, the outputting the second group of keys corresponding to the keyboard mode in response to the keyboard mode activation signal may include deactivating the first group of keys and outputting the second group of keys in the keyboard mode.

In addition, the second group of keys corresponding to the keyboard mode may include a plurality of keys 711 included in the keyboard layout and dividing lines 712 and 713 dividing the plurality of keys 711, and the first group of keys may be disposed between the dividing lines 712 and 713.

In addition, the method further includes outputting a third group of keys corresponding to the keyboard mode in response to the keyboard mode activation signal received from the display device 100, and the third group of keys may be disposed between the plurality of keys 711 included in the second group of keys and the dividing lines 712 and 713.

In addition, in a system including a display device 100 and a remote controller 200 configured to communicate with the display device 100 and to provide a remote control mode and a keyboard mode, the display device 100 may transmit a keyboard mode activation signal for character or number input to the remote controller 200, and the remote controller 200 may output a first group of keys corresponding to a remote control mode through the display unit 250 and output a second group of keys corresponding to the keyboard mode in response to the keyboard mode activation signal received from the display device 100.

In addition, the display device 100 may transmit a remote control mode activation signal to the remote controller 200 when character or number input is completed, and the remote controller 200 may output the first group of keys corresponding to the remote control mode in response to the remote control mode activation signal received from the display device 100.

On the other hand, the operating method or system shall be interpreted as being able to include all of the operations and configurations of the above-described remote controller.

The above description is merely illustrative of the technical spirit of the present disclosure, and various modifications and variations will be possible without departing from the essential characteristics of the present disclosure by those skilled in the art to which the present invention pertains.

Therefore, the embodiments disclosed in the present disclosure are not intended to limit the technical spirit of the present disclosure, but are intended to explain the technical spirit of the present disclosure, and the scope of the technical spirit of the present invention is not limited by these embodiments.

The scope of the present disclosure should be construed by the following claims, and all technical ideas within the equivalent range should be construed as being included in the scope of the present disclosure.

The invention claimed is:

1. A remote controller for providing a remote control mode and a keyboard mode, the remote controller comprising:
  a communication unit configured to communicate with a display device;
  a display unit; and
    a processor configured to:
    output a first group of keys corresponding to the remote control mode through the display unit, and
    output a second group of keys corresponding to the keyboard mode in response to a keyboard mode activation signal received from the display device,
    wherein when outputting the second group of keys corresponding to the keyboard mode, keys and dividing lines included in the second group of keys are disposed in orthogonal direction between the keys included in the first group of keys so as not to overlap with the keys included in the first group of keys, a key included in the second group of keys is located in a diagonal direction with a key included in the first group of keys, and the dividing line included in the second group of keys is aligned with the key included in the first group of keys.

2. The remote controller of claim 1, wherein the processor is configured to deactivate the first group of keys and to output the second group of keys in the keyboard mode, when the keyboard mode activation signal is received from the display device through the communication unit.

3. The remote controller of claim 2, wherein a case where the keyboard mode activation signal is received comprises a case where character or number input to the display device is required.

4. The remote controller of claim 1, further comprising a user input unit configured to receive user input, wherein the processor is configured to deactivate the first group of keys and to output the second group of keys in the keyboard mode, when a forced mode switching key is input through the user input unit.

5. The remote controller of claim 1, wherein the processor is configured to deactivate the second group of keys and to activate the first group of keys, when a keyboard use completion signal is received.

6. The remote controller of claim 1, wherein the remote controller further comprises a touch mode for controlling a cursor output on the display device, and wherein the processor is configured to switch the display unit to a touch pad capable of continuous touch input, when the touch mode is executed.

7. The remote controller of claim 1, wherein the first group of keys corresponding to the remote control mode comprises keys in a first area for number input and keys in a second area for input of a specific operation.

8. The remote controller of claim 7, wherein the second group of keys corresponding to the keyboard mode comprises a plurality of keys included in a keyboard layout and dividing lines dividing the plurality of keys, and wherein the first group of keys is disposed between the dividing lines.

9. The remote controller of claim 8, wherein the processor is configured to output a third group of keys corresponding to the keyboard mode in response to the keyboard mode activation signal received from the display device, and wherein the third group of keys is disposed between a plurality of keys included in the second group of keys and the dividing lines.

10. The remote controller of claim 9, wherein the third group of keys is a keyboard layout of a different language from the second group of keys.

11. A method of operating a remote controller for providing a remote control mode and a keyboard mode, the method comprising:

outputting a first group of keys corresponding to the remote control mode;

receiving a keyboard mode activation signal; and outputting a second group of keys corresponding to the keyboard mode in response to the keyboard mode activation signal, wherein when outputting the second group of keys corresponding to the keyboard mode, keys and dividing lines included in the second group of keys are disposed in orthogonal direction between the keys included in the first group of keys so as not to overlap with the keys included in the first group of keys, a key included in the second group of keys is located in a diagonal direction with a key included in the first group of keys, and the dividing line included in the second group of keys is aligned with the key included in the first group of keys.

12. The method of claim 11, wherein the outputting the second group of keys corresponding to the keyboard mode in response to the keyboard mode activation signal comprises deactivating the first group of keys and outputting the second group of keys in the keyboard mode.

13. The method of claim 11, wherein the second group of keys corresponding to the keyboard mode comprises a plurality of keys included in a keyboard layout and dividing lines dividing the plurality of keys, and wherein the first group of keys is disposed between the dividing lines.

14. The method of claim 11, further comprising outputting a third group of keys corresponding to the keyboard mode in response to the keyboard mode activation signal received from a display device, and wherein the third group of keys is disposed between a plurality of keys included in the second group of keys and the dividing lines.

15. A system comprising a display device and a remote controller configured to communicate with the display device and to provide a remote control mode and a keyboard mode, wherein the display device transmits a keyboard mode activation signal for character or number input to the remote controller, and wherein the remote controller outputs a first group of keys corresponding to the remote control mode through a display unit and outputs a second group of keys corresponding to the keyboard mode in response to a keyboard mode activation signal received from the display device, wherein when outputting the second group of keys corresponding to the keyboard mode, keys and dividing lines included in the second group of keys are disposed in orthogonal direction between the keys included in the first group of keys so as not to overlap with the keys included in the first group of keys, a key included in the second group of keys is located in a diagonal direction with a key included in the first group of keys, and the dividing line included in the second group of keys is aligned with the key included in the first group of keys.

16. The system of claim 15, wherein the display device transmits a remote control mode activation signal to the remote controller when character or number input is completed, and wherein the remote controller outputs the first group of keys corresponding to the remote control mode in response to the remote control activation signal received from the display device.

17. The system of claim 15, wherein the first group of keys corresponding to the remote control mode comprises keys in a first area for number input and keys in a second area for input of a specific operation.

18. The system of claim 17,
wherein the second group of keys corresponding to the keyboard mode comprises a plurality of keys included in a keyboard layout and dividing lines dividing the plurality of keys, and
wherein the first group of keys is disposed between the dividing lines.

* * * * *